United States Patent
Lewis

(10) Patent No.: US 9,347,251 B1
(45) Date of Patent: May 24, 2016

(54) STAY-OPEN UNIVERSAL AUTOMOBILE DOOR JAM

(71) Applicant: Jerry Glenn Lewis, San Diego, CA (US)

(72) Inventor: Jerry Glenn Lewis, San Diego, CA (US)

(*) Notice: Subject to any disclaimer, the term of this patent is extended or adjusted under 35 U.S.C. 154(b) by 0 days.

(21) Appl. No.: 14/953,347

(22) Filed: Nov. 29, 2015

Related U.S. Application Data

(63) Continuation-in-part of application No. 14/589,280, filed on Jan. 5, 2015, now Pat. No. 9,238,931.

(51) Int. Cl.
| | |
|---|---|
| *E05F 5/06* | (2006.01) |
| *B60R 99/00* | (2009.01) |
| *B60R 11/00* | (2006.01) |

(52) U.S. Cl.
CPC . *E05F 5/06* (2013.01); *B60R 99/00* (2013.01); *B60R 2011/005* (2013.01)

(58) Field of Classification Search
CPC .......... E04F 5/06; E05C 17/54; E05C 17/203; E05F 5/04; E05F 5/06
USPC ...... 16/82, 86 R, 86 A, 83, 85, 319; 292/288, 292/343, DIG. 15
See application file for complete search history.

(56) References Cited

U.S. PATENT DOCUMENTS

| | | | | |
|---|---|---|---|---|
| 896,242 A * | 8/1908 | Ralston | ..................... | E05F 5/04 16/83 |
| 1,644,679 A * | 10/1927 | Ledwinka | ............... | E05F 5/025 16/86 A |
| 2,617,140 A * | 11/1952 | Desy | ......................... | E05F 5/06 16/86 A |
| 3,116,946 A * | 1/1964 | Deloume | .............. | E05C 17/443 16/85 |
| 3,118,946 A * | 1/1964 | Jenay | ..................... | C07C 33/025 564/303 |
| 3,129,969 A * | 4/1964 | Kuo | ....................... | E05C 17/443 16/86 A |
| 5,027,471 A * | 7/1991 | Barnes | .................... | E05D 11/00 16/374 |
| 8,496,278 B2 * | 7/2013 | Lee | .......................... | E05C 17/54 16/82 |
| 2008/0209675 A1 * | 9/2008 | Sempert | ................ | E05C 17/203 16/85 |
| 2008/0307604 A1 * | 12/2008 | Leung | ....................... | E05F 5/06 16/82 |
| 2009/0139050 A1 * | 6/2009 | Junkins | .................... | E05C 17/54 16/84 |
| 2009/0320237 A1 * | 12/2009 | Kersting | ................... | E05F 5/06 16/82 |
| 2011/0154610 A1 * | 6/2011 | Sanz | ......................... | E05F 5/04 16/82 |

* cited by examiner

*Primary Examiner* — William Gilbert

(57) ABSTRACT

The invention is a simple, low-cost, mechanical device to be inserted in the hinge area of an open door of a parked vehicle to keep the door open while people or equipment are added to or removed from the automobile. A particular use of the invention is as a safety mechanism to hold the passenger-side door open while a disabled passenger is assisted in exiting the vehicle without the care-giving individual having to hold the door open or having the door slam shut on the disabled person. After this use, the device may be removed and stored in the glove compartment for easy access.

1 Claim, 3 Drawing Sheets

STAY-OPEN UNIVERSAL AUTOMOBILE DOOR JAM

CROSS-REFERENCE TO RELATED APPLICATIONS

This application is a continuation-in-part of U.S. application Ser. No. 14/589,280, filed on Jan. 5, 2015, and claims the benefit of that Application, the disclosure of which is hereby incorporated by reference in its entirety.

BACKGROUND OF THE INVENTION

The invention is a mechanical device which is to be temporarily inserted in the open door hinge of a parked automobile to keep the door open while people or equipment are added to or removed from the automobile.

A particular use of the invention is to independently hold the passenger-side door open while a disabled passenger is assisted in entering or exiting the vehicle without the assisting individual having to hold the door open. In this case, the invention serves as a safety device.

In the same scenario, having the door held open by the invention allows the disabled individual to use the door for additional assistance in entering or exiting the vehicle without the risk of pulling the door closed on the disabled person or the caregiver.

The inventor has found no prior art that was directed to the same purpose as the present invention. However, it is clear to those skilled in the art that the same general purpose could be accomplished by a solenoid-piston electrical device permanently installed in the hinge area of the door, although at a considerably higher cost than the present invention, with the likely need for professional installation.

SUMMARY OF THE INVENTION

The invention consists of a wheel-shaped device attached to a hook which a driver or passenger of the automobile temporarily hooks over the existing hinge of an automobile door so that the wheel-shaped device forms a barrier between the body and the door of the automobile such that the door cannot close.

The hook and wheel are attached at the axle of the wheel so that the wheel can turn as the door tries to close, caused either by its own weight or by the passenger pulling on it. Having the ability to turn results in limiting any possible damage to the paint or the insulation trim around the door as it tries to close.

The closure prevention product has numerous advantages, such as storage in a glove compartment for easy access because of its small size, almost universal adaptability to all makes and models of automobiles with the flexibility to readily change wheel sizes to fit into the hinge gap in the door opening, ease of use by a consumer not skilled in the art, resisting scraping paint or insulation trim from the door hinge area due to the invention's materials of construction, the ability to 'self-adjust' to the opening size due to the geometry of the wheel, being strong enough to resist the door closing, and being not too heavy for the typical consumer to use.

DETAILED DESCRIPTION OF THE PREFERRED EMBODIMENT

Figure 1:
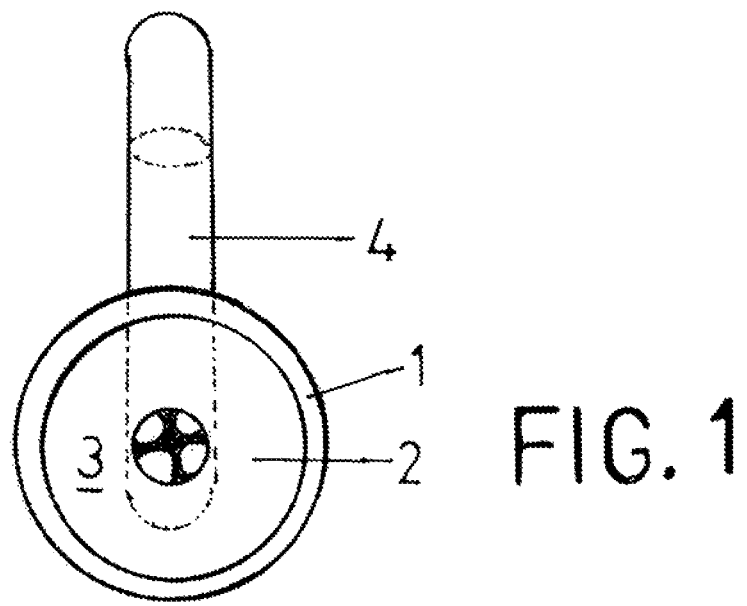
FIG. 1 is a front view of the invention showing the wheel and the hook arrangement. This is the view that a user would see when the invention was in position on the door hinge.
Figure 2:
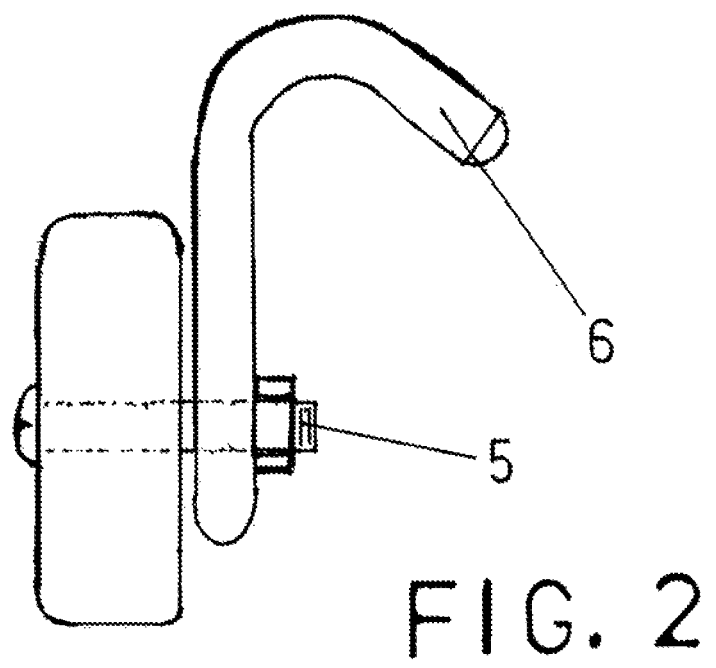
FIG. 2 is a side view showing how the hook is attached to the axle of the wheel using a bolt and nut system.
Figure 3:
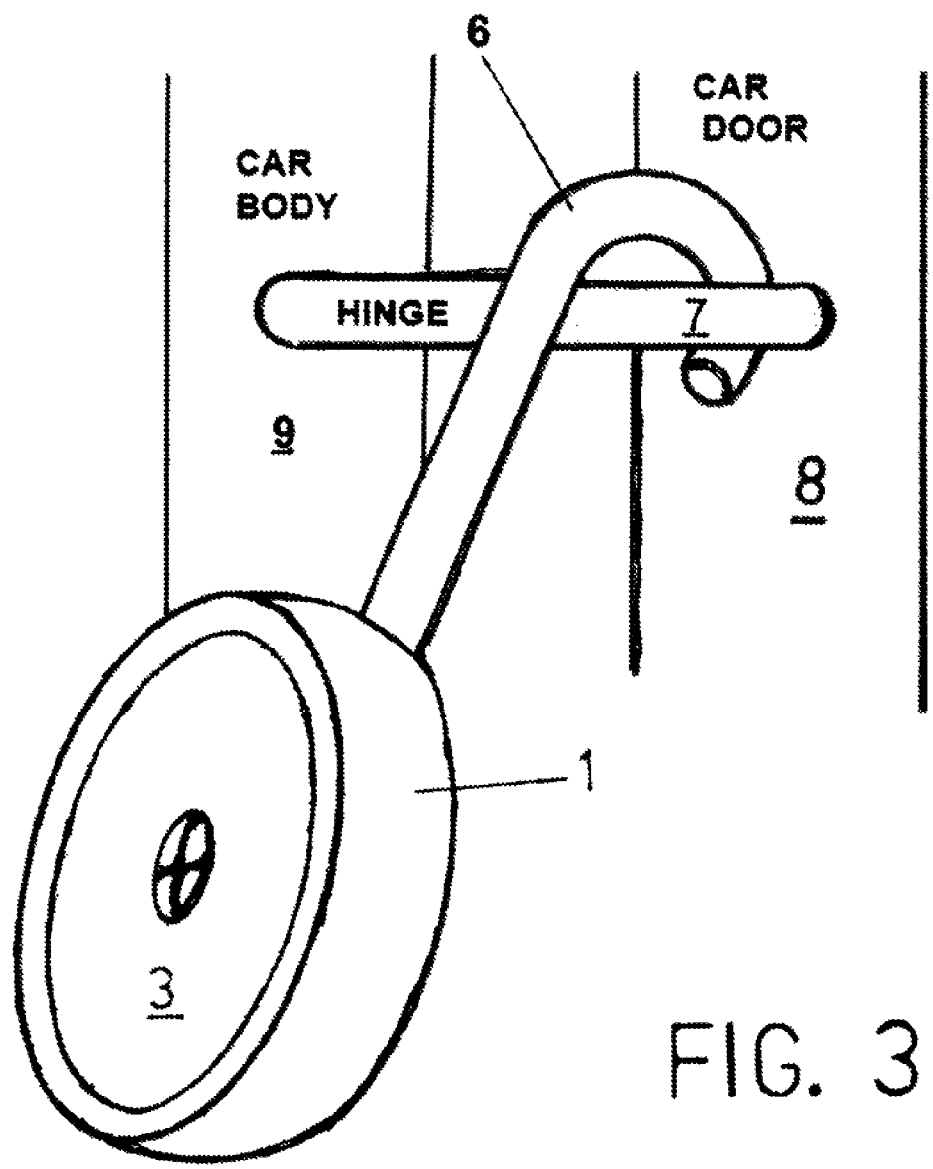
FIG. 3 is an oblique view showing how the hook fits over the hinge.

With reference to FIG. 1, FIG. 2, and FIG. 3, the wheel tread 1 is constructed of a tread material which will not scrape paint or insulation trim from the door or body of the vehicle as the door tries to close. Materials of construction of the tread can therefore be plastic, rubber, leather, cloth, or any other smooth material which has a low coefficient of friction such as those named above.

The wheel inner structure 2 must be constructed in a way to bear the compressive force of the door as it tries to close by its own weight or someone trying to pull the door in the direction of closing. A strong plastic or metal normally used in the construction of commercially available wheels 3 of the appropriate size, which is approximately 5 cm (2 inches) to 15 cm (6 inches) in diameter, is generally acceptable and is readily available in most hardware stores.

The hook 4 is preferably made of stainless steel (304SS or 316SS) for its strength and corrosion resistance, or is zinc-coated, or made from a strong polymer. The hook extends about 10 cm (4 inches) to 13 cm (5 inches) from the center of the wheel where it is attached by a strong bolt and nut assembly 5, of maximum practical size, to the axle of the wheel. The 'bent' 'portion of the hook 6 has an opening of approximately 2.5 cm (1 inch) to 8 cm (3 inches), and the length of the 'bent' portion of the hook is about 4.5 cm (1.75 inches) to 7 cm (2.75 inches) long. The hook 4 has a cross-sectional diameter of approximately 1 cm (⅜ inch), though the diameter could be +/−0.5 cm (³⁄₁₆ inch) without interfering with the purpose intended.

To use the invention, a person grasps the wheel and hook in one hand and guides it into the hinge area of the open door, hooking the "hook" over the top or bottom hinge 7 such that the "wheel" naturally falls into place between the door 8 and the body 9 of the automobile. For safety, the person may then check that all parts form the proper jam by trying to close the door. While it is true that the design of the hinge differs by make and model of car, the invention overcomes that difference in design by the fact that the hook simply fits over the existing hinge no matter how the hinge is designed or how it works. The present invention is a mechanical device that serves as a jam and does not depend on the design of the hinge.

After the movement of people or goods into or out of the automobile is completed, a person then grasps the wheel and hook and lifts the hook out from behind the hinge and stores it for the next user.

If the wheel is too large or too small to fit in the hinge area, a larger or smaller wheel can be used. The same is true for the hook. The space in the hinge opening can be measured before attempting installation. The hook has to completely fit over the hinge. The wheel should be a large enough diameter that it fills the space between the door and the car body, but small enough that it goes easily in position when the hook is placed completely over the hinge. This can be easily done by one skilled in the art or can be done by a typical consumer by trying different size wheels and hooks.

Figure 4:
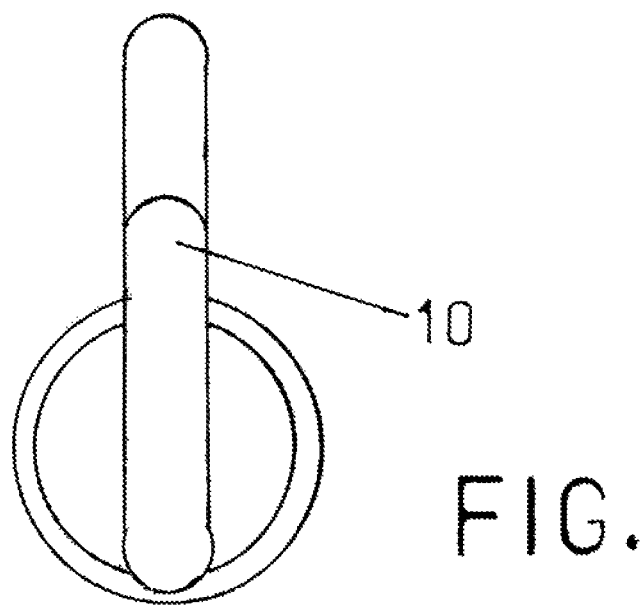
FIG. 4 is a front view showing one embodiment where the hook is constructed with a handle to increase the ease of use.
Figure 5:
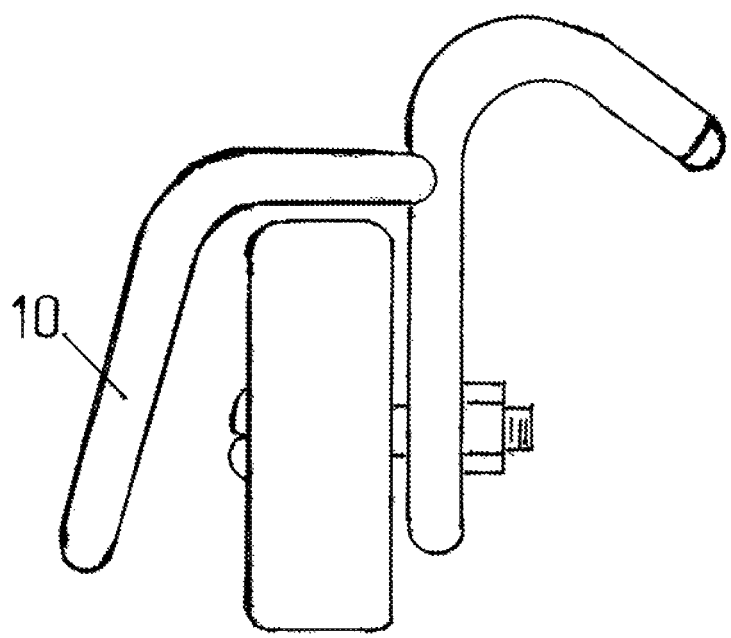
FIG. 5 is a side view showing the handle in FIG. 4.

With reference to FIG. 4 and FIG. 5, for the preferred embodiment, a handle 10 can be attached to the hook 4 to make the closure prevention product safer and easier to install or remove from the hinge area of the door. The method of connection of the handle to the hook is preferably by including the handle in the manufacturing of the hook or by welding the two items together during construction of the closure prevention product. However, the handle can be constructed separate from the hook and then attached by a screwed connection between the handle and the hook.

What is claimed is:

1. A method of preventing a vehicle door from closing, comprising:

Providing a closure prevention product, said product comprising a wheel with a first and second surface defining a thickness there between and a circular perimeter, said wheel being made of a plastic or metal material, and a tread attached to the perimeter of the wheel, said tread having a smooth surface and a low coefficient of friction, said wheel having a first aperture passing through said thickness and located at the midpoint of the first and second surfaces; a hook having a first end portion with a second aperture in substantial alignment with said first aperture; and a bolt passing through said first and second apertures and connecting said hook to said wheel by a nut connected to said bolt; a handle connected to said hook, such that said handle provides an extension of said hook without interfering with the movement of said wheel and without obstructing contact between said door and said wheel;

providing a vehicle door with a hinge connecting said door to a body of said vehicle;

using said handle to place said hook of said product over said hinge so that said hinge supports said closure prevention product;

whereby said product prevents said door from closing when said hook is installed over said hinge.

* * * * *